(12) United States Patent
Smith et al.

(10) Patent No.: US 9,533,723 B2
(45) Date of Patent: Jan. 3, 2017

(54) MOUNTING STRUCTURE WITH STORABLE TRANSPORT SYSTEM

(71) Applicant: Entro Industries, Inc., Hillsboro, OR (US)

(72) Inventors: Shawn R. Smith, Hillsboro, OR (US); Justin M. Carey, Beaverton, OR (US)

(73) Assignee: ENTRO INDUSTRIES, INC., Hillsboro, OR (US)

( * ) Notice: Subject to any disclaimer, the term of this patent is extended or adjusted under 35 U.S.C. 154(b) by 0 days.

(21) Appl. No.: 14/529,566

(22) Filed: Oct. 31, 2014

(65) Prior Publication Data
US 2015/0053426 A1   Feb. 26, 2015

Related U.S. Application Data

(63) Continuation-in-part of application No. 13/909,969, filed on Jun. 4, 2013, which is a continuation-in-part of application No. 13/711,193, filed on Dec. 11, 2012, now Pat. No. 8,573,334, and a continuation-in-part of application No. 13/711,269, filed on Dec. 11, 2012, now Pat. No. 8,561,733, and a continuation-in-part of

(60) Provisional application No. 61/757,517, filed on Jan. 28, 2013, provisional application No. 61/576,657, filed on Dec. 16, 2011.
(Continued)

(51) Int. Cl.
| | |
|---|---|
| B62D 51/06 | (2006.01) |
| B62D 57/02 | (2006.01) |
| E21B 15/00 | (2006.01) |
| B62D 57/032 | (2006.01) |

(52) U.S. Cl.
CPC ............. *B62D 57/02* (2013.01); *B62D 57/032* (2013.01); *E21B 15/003* (2013.01); *E21B 15/006* (2013.01)

(58) Field of Classification Search
CPC ........ B62D 57/00; B62D 57/02; B62D 57/032
USPC ............................................ 180/8.1, 8.5, 8.6
See application file for complete search history.

(56) References Cited

U.S. PATENT DOCUMENTS

| | | | | |
|---|---|---|---|---|
| 1,001,299 A | | 8/1911 | Page | |
| 1,242,635 A | * | 10/1917 | Anderson | ..................... 180/187 |

(Continued)

OTHER PUBLICATIONS

Entro Industries, Inc. brochure "The Future of Rig Walkers", Jun. 2012, 4 pages.
(Continued)

*Primary Examiner* — Joseph Rocca
*Assistant Examiner* — Conan Duda
(74) *Attorney, Agent, or Firm* — Schwabe Williamson & Wyatt

(57) ABSTRACT

A mounting structure for a rig may include a base configured to support the mounting structure on an operating surface and a plurality of transport systems operatively connected to the base and configured to lift the mounting structure off of the operating surface. An elevated rig platform may be connected to the base by a plurality of support struts, wherein at least some of the support struts comprise a mounting connection that is configured to pivot to lower the elevated rig platform toward the base and place the mounting structure in a partially collapsed state. Additionally, a connecting member may be attached to one or more of the plurality of transport systems, wherein in response to the elevated rig platform being lowered to the partially collapsed state, the connecting member may be configured to displace at least a portion of the one or more transport systems.

19 Claims, 12 Drawing Sheets

Related U.S. Application Data application No. 13/711,315, filed on Dec. 11, 2012, now Pat. No. 8,490,724.

(56) References Cited

U.S. PATENT DOCUMENTS

| | | | |
|---|---|---|---|
| 1,879,446 A | | 9/1932 | Page |
| 2,132,184 A | | 10/1938 | Poche |
| 2,259,200 A | | 10/1941 | Cameron et al. |
| 2,541,496 A | | 2/1951 | Busick, Jr. et al. |
| 2,914,127 A | | 11/1959 | Ricouard |
| 3,334,849 A | * | 8/1967 | Bronder ............... 248/647 |
| 3,362,553 A | * | 1/1968 | Weinmann ............ 414/476 |
| 3,576,225 A | | 4/1971 | Chambers |
| 3,754,361 A | * | 8/1973 | Branham et al. ........... 52/115 |
| 3,921,739 A | * | 11/1975 | Rich et al. ............. 180/8.5 |
| RE29,541 E | | 2/1978 | Russell |
| 4,135,340 A | | 1/1979 | Cox |
| 4,290,495 A | | 9/1981 | Elliston |
| 4,296,820 A | | 10/1981 | Loftis |
| 4,324,077 A | * | 4/1982 | Woolslayer ............. 52/143 |
| 4,371,041 A | | 2/1983 | Becker |
| 4,375,892 A | * | 3/1983 | Jenkins et al. ......... 280/43.23 |
| 4,759,414 A | | 7/1988 | Willis |
| 4,821,816 A | | 4/1989 | Willis |
| 4,823,870 A | | 4/1989 | Sorokan |
| 4,831,795 A | | 5/1989 | Sorokan |
| 5,248,005 A | | 9/1993 | Mochizuki |
| 5,492,436 A | | 2/1996 | Suksumake |
| 5,794,723 A | | 8/1998 | Caneer |
| 5,921,336 A | | 7/1999 | Reed |
| 6,474,926 B2 | * | 11/2002 | Weiss .................... 414/332 |
| 6,554,145 B1 | * | 4/2003 | Fantuzzi ................ 212/344 |
| 6,581,525 B2 | | 6/2003 | Smith |
| 7,182,163 B1 | | 2/2007 | Gipson |
| 7,308,953 B2 | | 12/2007 | Barnes |
| 7,681,674 B1 | * | 3/2010 | Barnes et al. ........... 180/8.1 |
| 8,250,816 B2 | | 8/2012 | Donnally et al. |
| 8,468,753 B2 | | 6/2013 | Donnally et al. |
| 8,556,003 B2 | | 10/2013 | Souchek |
| 8,887,800 B2 | * | 11/2014 | Havinga et al. ......... 166/77.1 |
| 2004/0211598 A1 | | 10/2004 | Palidis |
| 2004/0240973 A1 | * | 12/2004 | Andrews et al. ......... 414/332 |
| 2006/0027373 A1 | | 2/2006 | Carriere |
| 2006/0213653 A1 | * | 9/2006 | Cunningham et al. ...... 166/77.1 |
| 2009/0200856 A1 | | 8/2009 | Chehade |
| 2009/0283324 A1 | * | 11/2009 | Konduc et al. ............ 175/57 |
| 2011/0114386 A1 | | 5/2011 | Souchek |
| 2014/0158342 A1 | | 6/2014 | Smith |

OTHER PUBLICATIONS

Columbia Industries LLC brochure "Kodiak Cub Rig Walking System", 2009, 4 pages.

\* cited by examiner

MOUNTING STRUCTURE WITH STORABLE TRANSPORT SYSTEM

STATEMENT OF RELATED MATTERS

This application claims priority to and is a continuation-in-part of U.S. patent application Ser. No. 13/909,969, filed Jun. 4, 2013, now U.S. Pat. No. 9,096,282issued Aug. 4, 2015, which claims priority to U.S. Provisional Application No. 61/757,517, filed Jan. 28, 2013. U.S. patent application Ser. No. 13/909,969 is a continuation-in-part of U.S. patent application Ser. No. 13/711,193, filed Dec. 11, 2012, now U.S. Pat. No. 8,573,334, issued Nov. 5, 2013, which claims priority to U.S. Provisional Application No. 61/576,657, filed Dec. 16, 2011. U.S. patent application Ser. No. 13/909, 969 is also a continuation-in-part of U.S. patent application Ser. No. 13/711,269, filed Dec. 11, 2012, now U.S. Pat. No. 8,561,733, issued Oct. 22, 2013, which claims priority to U.S. Provisional Application No. 61/576,657, filed Dec. 16, 2011. Additionally, U.S. patent application Ser. No. 13/909, 969 is a continuation-in-part of U.S. patent application Ser. No. 13/711,315, filed Dec. 11, 2012, now U.S. Pat. No. 8,490,724, issued Jul. 23, 2013, which claims priority to U.S. Provisional Application No. 61/576,657, filed Dec. 16, 2011. The contents of all the above patents and patent applications are herein incorporated by reference in their entireties.

TECHNICAL FIELD

This disclosure generally relates to systems, devices and methods for transporting a mounting structure configured to support a rig and/or a heavy load.

SUMMARY

A mounting structure for a rig is herein disclosed as comprising a base configured to support the mounting structure on an operating surface and a plurality of transport systems operatively connected to the base and configured to lift the mounting structure off of the operating surface. An elevated rig platform may be connected to the base by a plurality of support struts. At least some of the support struts comprise a mounting connection that is configured to pivot to lower the elevated rig platform toward the base and place the mounting structure in a partially collapsed state. Additionally, a connecting member may be attached to one or more of the plurality of transport systems. In response to the elevated rig platform being lowered to the partially collapsed state, the connecting member may be configured to displace at least a portion of the one or more transport systems while the base remains in contact with the operating surface.

In some examples, a mounting structure for a rig may comprise a base configured to support the mounting structure on an operating surface, and means for lifting the base off of the operating surface. An elevated rig platform may be connected to the base by a plurality of support struts. At least some of the support struts may comprise a mounting connection that pivots to lower the elevated rig platform toward the base and place the mounting structure in a partially collapsed state. Additionally, the mounting structure may comprise means for displacing at least a portion of the means for lifting in response to the elevated rig platform being lowered to the partially collapsed state. The portion of the means for lifting may be displaced while the base remains in contact with the operating surface.

Further disclosed herein is a method for placing a mounting structure in a partially collapsed state. The method may comprise supporting a base of the mounting structure on an operating surface and lifting, with a transport system, the base off of the operating surface to move the mounting structure to a destination. The transport system may be configured to lower the base to contact the operating surface at the destination. In some examples, an elevated platform may be connected to the base by a plurality of support struts. The elevated platform may be lowered while the base is in contact with the operating surface. At least some of the support struts comprise a mounting connection that pivots to lower the elevated rig platform toward the base. Additionally, the method may comprise displacing, with a connecting member, at least a portion of the transport system in response to the elevated rig platform being lowered. The portion of the transport system may be displaced by the connecting member while the base remains in contact with the operating surface.

BACKGROUND

Moving extremely heavy loads has generally been a complicated task because of the large forces involved in lifting and transporting the heavy loads. In known mounting structures, large loads may be transported by disassembling or breaking up the load or the mounting structure into multiple smaller sections and/or loads. However, this breakdown and subsequent reassembly process can be very time consuming, especially when a heavy load is only to be moved a small distance, or needs to be repositioned.

For heavy loads that need periodic movement or adjustment, devices commonly referred to as "walking machines" or "walkers" were developed. These machines may be configured to move the heavy loads over small distances in incremental stages. For example, walking machines may be used to move large structures, such as oil rigs, in order to position them over pre-drilled pipes in oil fields.

The inclusion of a walking system to a mounting structure may involve additional support structures or connections in order to transfer the weight of the mounting structure and/or load to the walking system. The support structures and/or connections may require additional time for assembly and/or disassembly during various operations associated with the mounting structure, such as operations associated with storage and/or transportation of the mounting structure over relatively large distances.

The present invention addresses these and other problems.

DETAILED DESCRIPTION

Walkers, or walking machines, may comprise one or more devices that are used for transporting very heavy loads, such as entire oil well drilling rigs. Such loads may be as heavy as several thousand tons and may be sequentially positioned very precisely over spaced-apart well bores, for example. Load transporting apparatuses or systems may include one or more walking machines, depending on the specific configuration of a walking system.

Figure 1:
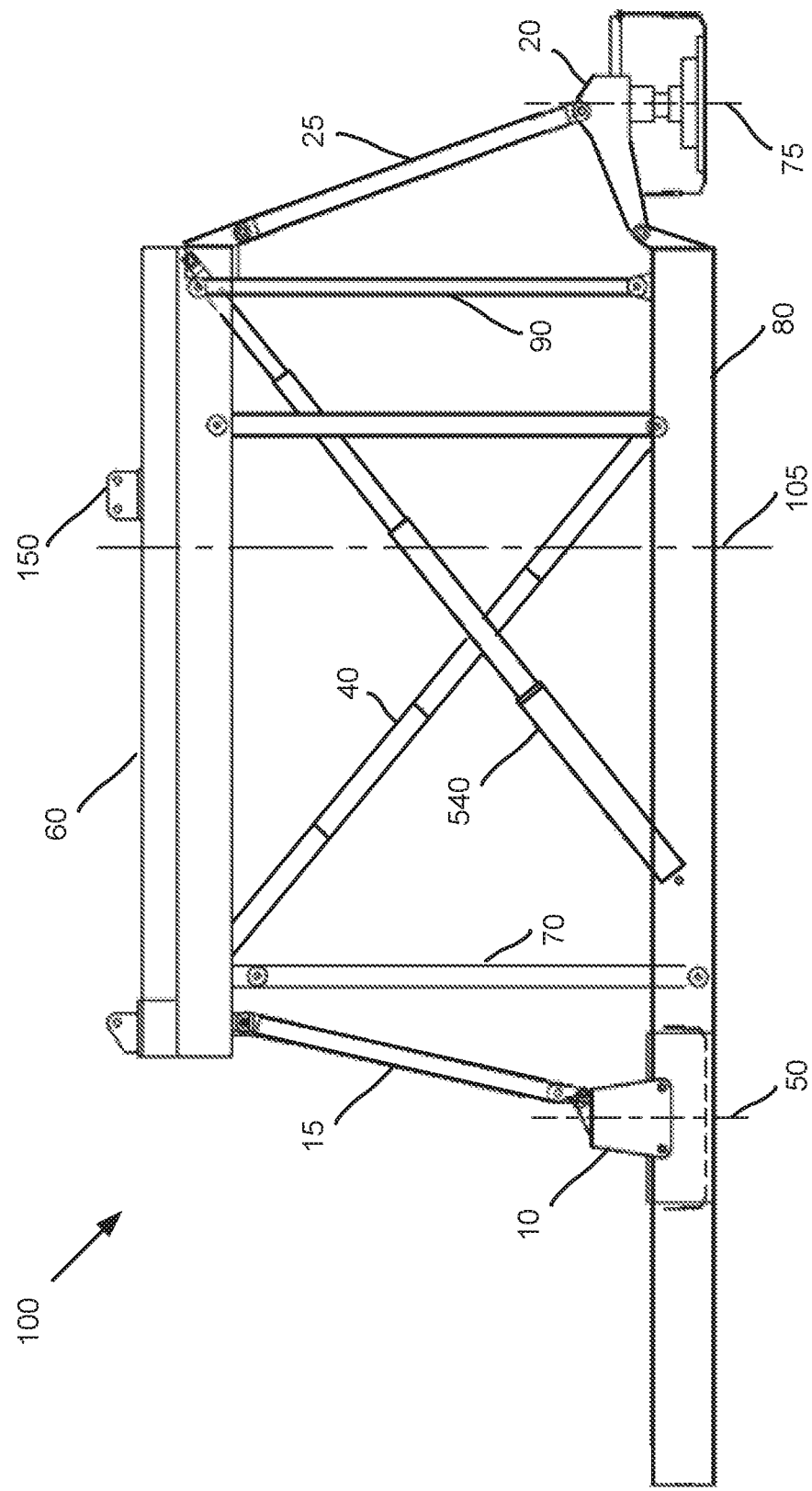
FIG. 1 illustrates an example mounting structure.

FIG. 1 illustrates an example mounting structure 100 such as may be used to support an oil rig. Mounting structure 100 may comprise a rig platform 60 connected to a base 80 by one or more rear legs such as first leg 70 and one or more front legs, such as second leg 90. Rig platform 60 may comprise a rig support structure 150 configured to support a mast, a drill, traveling blocks, and other components associated with a rig or other type of heavy load supported by mounting structure 100.

In some examples, mounting structure 100 may be placed over a well head such that a well head centerline 105 of mounting structure 100 may be located between first leg 70 and second leg 90. Additionally, the rig platform 60 may be connected to the base 80 by one or more struts, such as rear transport strut 15 and/or front transport strut 25, and one or more hydraulic cylinders, such as hydraulic cylinder 540. Hydraulic cylinder 540 may comprise a telescoping hydraulic cylinder. Additionally, one or more telescoping struts, such as diagonal strut 40, may be configured to provide additional support of mounting structure 100.

Mounting structure 100 may comprise a walking system including a number of transport systems 10, 20 configured to position or move mounting structure 100 over the well head. In some examples, transport systems 10, 20 may comprise one or more of the transportation devices and/or systems described in U.S. Pat. No. 8,573,334, U.S. Pat. No. 8,561,733, and U.S. Pat. No. 8,490,724, or any combination thereof.

In some examples, transport struts 15, 25 may be configured to primarily provide structural support while transport systems 10, 20 are moving mounting structure 100 and a rig and/or load supported by mounting structure 100. In some examples, one or both of transport struts 15, 25 may be oriented at a diagonal angle in order to offset or redistribute the weight of the load. For example, front transport strut 25 may be configured to provide an offset load bearing path from rig platform 60 to transportation device 20 located outside of, and/or in front of, base 80.

Base 80 may be configured to support the weight of mounting structure 100 during operation of a rig, in which case base may be in contact with the ground or other surface upon which mounting structure 100 is located. In some examples, transportation devices 10, 20 may be configured to lift base 80 and/or the entire mounting structure 100 off the ground, such as when the rig is being moved from one well head to another well head. A first set of one or more transport devices, such as transport device 10, may be configured to lift approximately half of the weight of mounting structure 100 at a first load bearing position 50. A second set of one or more transport devices, such as transport device 20, may be configured to lift approximately half of the weight of mounting structure 100 at a second load bearing position 75. In some examples, more than two load bearing positions may be used to lift and/or move mounting structure 100.

Figure 2:
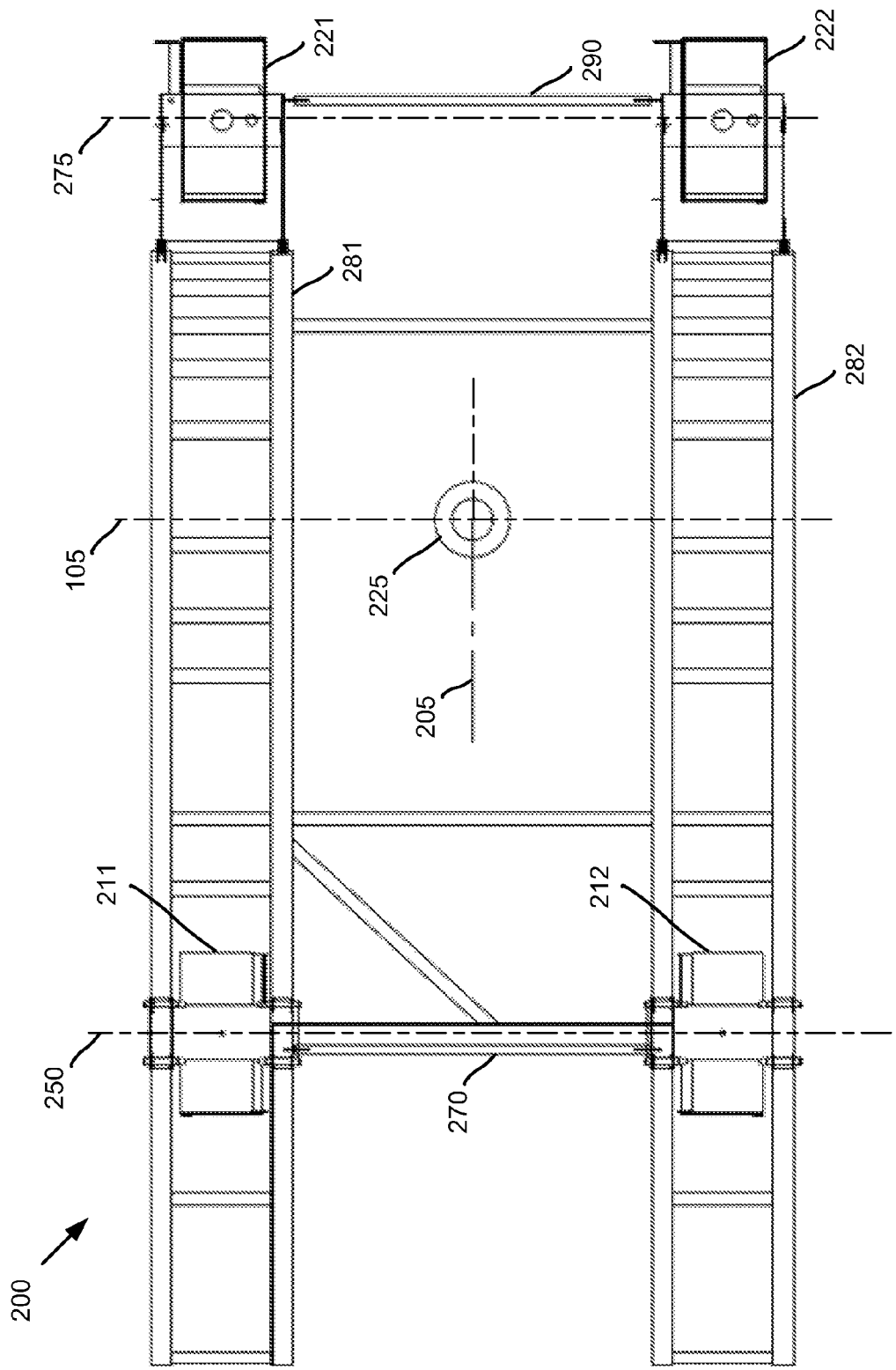
FIG. 2 illustrates a bottom view of a mounting structure.

FIG. 2 illustrates a bottom view of a mounting structure 200 which may be configured similarly as mounting structure 100 of FIG. 1. Mounting structure 200 may comprise one or more struts, such as struts 270 and 290, connecting a left side base 281 of mounting structure 200 with a right side base 282 of mounting structure 200. A first set of transportation devices comprising a first rear transport device 211 and a second rear transport device 212 may be associated with a first load bearing position 250. Additionally, a second set of transportation devices comprising a first front transport device 221 and a second front transport device 222 may be associated with a second load bearing position 275.

During operation of a rig associated with mounting structure 200, a well head 225 may be located between first load bearing position 250 and second load bearing position 275. For example, well head 225 may be located at the intersection formed by well head centerline 105 and a longitudinal centerline 205 of mounting structure 200.

First rear transport device 211 and second rear transport device 212 are illustrated as being located within left side base 281 and right side base 282, respectively. Locating one or more transportation devices within the base framework may provide lateral clearance when mounting structure 200 travels over the well head 225, such that the well head 225 and associated casing, valving, etc. pass between left side base 281 and right side base 282.

Figure 3:
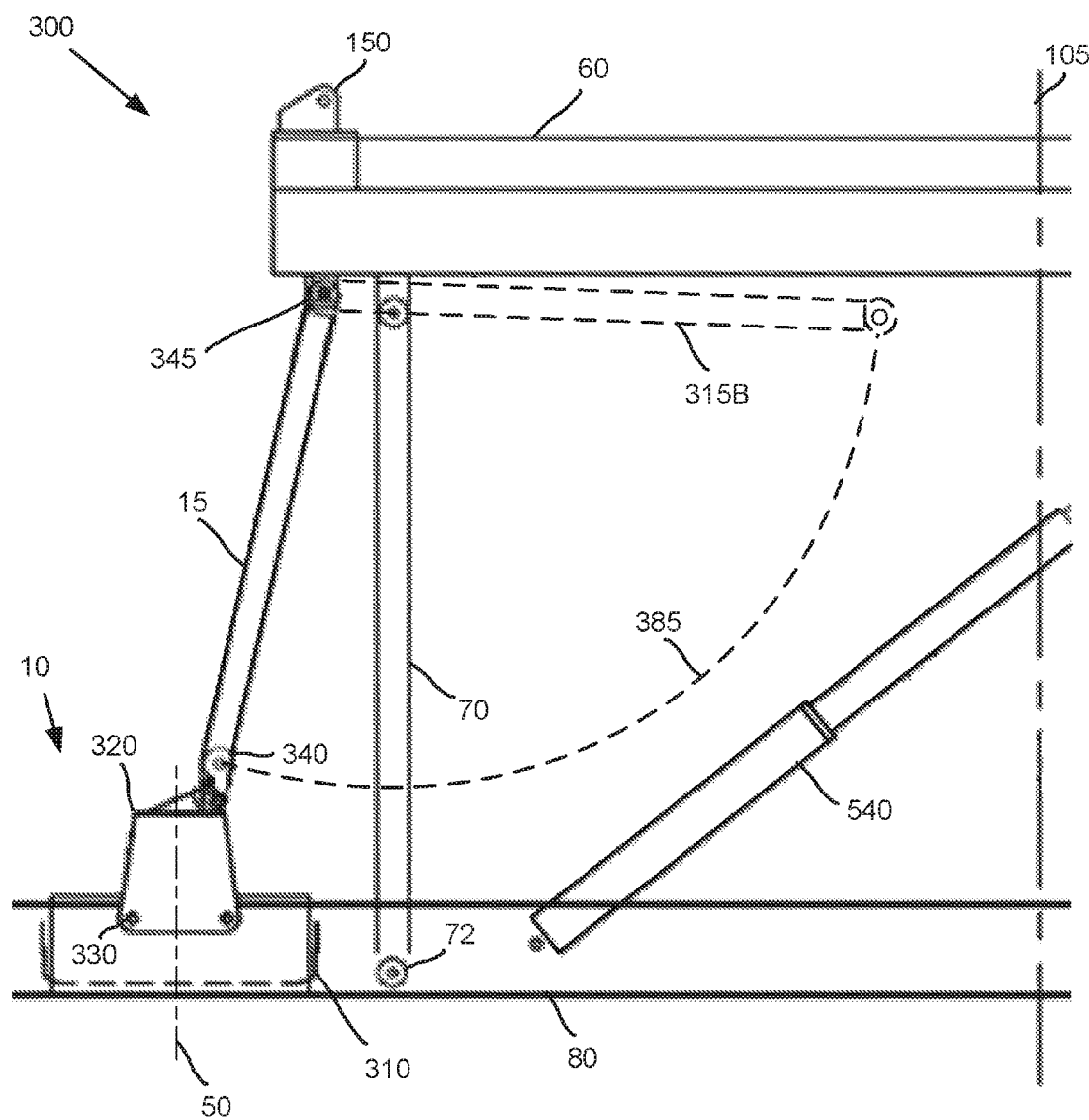
FIG. 3 illustrates an enlarged partial view of a mounting structure comprising a first support structure.

FIG. 3 illustrates an enlarged partial view of a mounting structure 300 comprising a first transportation system, such as transport system 10 of FIG. 1. First transport system 10 may comprise a transport support 320, a base connection 330, and/or a transportation device 310. Transport support 320 may be configured to connect strut 15 to base 80. Transport support 320 may be connected to base 80 via base connection 330. In some examples, transport support 320 may comprise one or more bolts, pins, rods, hooks, clamps, latches, other types of connection devices, or any combination thereof.

Strut 15 may be connected to transport support 320 at a first end 340 of strut 15. Additionally, strut 15 may be connected to rig platform 60 at a second end 345 of strut 15. In some examples, strut 15 may be configured to diagonally connect rig platform 60 to base 80 at a point located above transportation device 310. When mounting structure 300 is at rest with base 80 in contact with the ground or operating surface, the weight of the associated drill and/or load located on rig platform 60 may be primarily borne by first leg 70. First leg 70 may be positioned directly below one or more support legs of rig support structure 150.

Strut 15 may be configured to transfer at least a portion of the weight of the drill and/or load (along with a portion of the overall weight of mounting structure 300) from first leg 70 to first load bearing position 50 when mounting structure 300 is in a raised position on transportation device 310, e.g., when base 80 is lifted off the ground.

One or more transportation devices, such as transportation device 310, may be configured to raise and lower the entire mounting structure 300 during operation of the drill, e.g. to move the drill relatively short distances from one well head centerline 105 to another well head. However in some examples, mounting structure 300 may be moved relatively large distances, such as from a first drilling site to another drilling site, which may be located many miles distant from each other, in which case it may be impractical to rely on transportation device 310 to provide the sole means for transportation.

Mounting structure 300 may be configured to be placed into a compact state for distant transportation. In some examples, one or more hydraulic cylinders, such as hydraulic cylinder 540, may be configured to raise and/or lower rig platform 60 with respect to base 80. In preparation for, or in the process of, lowering mounting structure 300 into the compact state, strut 15 may be disconnected from one or both of base 80 and rig platform 60. In some examples, first end 340 of strut 15 may be disconnected from transport support 320.

Strut 15 may be rotated to an approximately horizontal transport/storage position 315B, shown in dashed lines. Being connected to transport support 320 at a raised elevation with respect to base 80, first end 340 of strut 15 may rotate along an arc 385 with sufficient clearance to avoid contact with base 80 as strut 15 is rotated into transport/storage position 315B. The lower portion of first leg 70 may be pivotably connected to base 80 at a pivoting connection 72.

Figure 4:
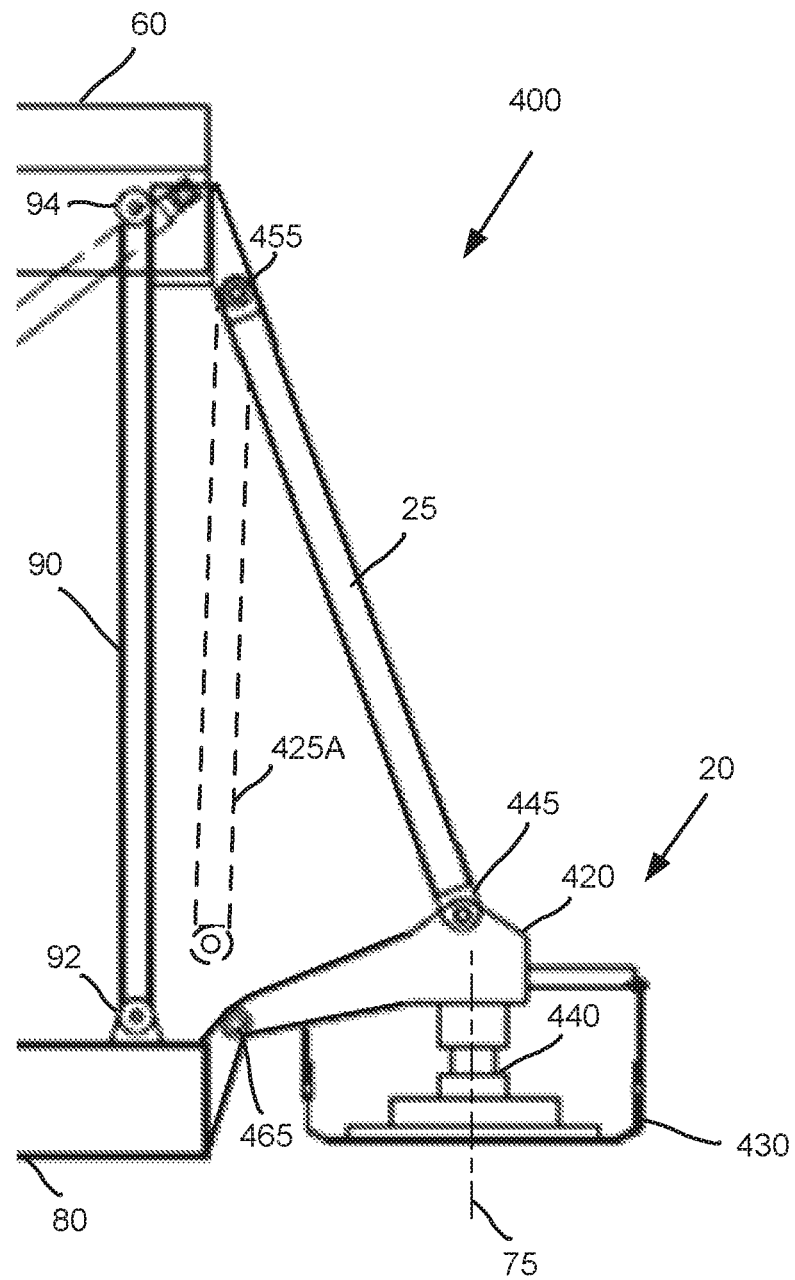
FIG. 4 illustrates an enlarged partial view of a mounting structure comprising a second support structure.

FIG. 4 illustrates an enlarged partial view of a mounting structure 400 comprising a second transport system, such as transport system 20 of FIG. 1. Second transport system 20 may comprise a transport support 420 and/or a transportation device 430. Transportation device 430 may comprise a hydraulic device 440 configured to lift, lower, move, and/or rotate transportation device 430 with respect to transport support 420.

Transport support 420 may be configured to connect strut 25 to base 80. In some examples, strut 25 may be connected to transport support 420 at a point above transportation device 430. Additionally, transport support 420 may be connected to base 80 at a connection point 465. In some examples, connection point 465 may provide for a pivot point about which at least a portion of second transport system 20 may rotate and/or be raised. Transportation device 430 may be located in front of rig platform 60 and/or in front of base 80.

Strut 25 may be connected to transport support 420 at a first end 445 of strut 25. Additionally, strut 25 may be connected to rig platform 60 at a second end 455 of strut 25. In some examples, strut 25 may be configured to diagonally connect rig platform 60 to transport support 420 at the point located above transportation device 430. When mounting structure 400 is at rest with base 80 in contact with the ground or operating surface, the weight of the associated drill and/or load located on rig platform 60 may be primarily borne by second leg 90. In some examples, second leg 90 may be positioned directly below one or more support legs of rig support structure 150 (FIG. 1).

Strut 25 may be configured to transfer at least a portion of the weight of the drill and/or load (along with a portion of the overall weight of mounting structure 400) from second leg 90 to second load bearing position 75 when mounting structure 400 is in a raised position on transportation device 430, e.g., when base 80 is lifted off the ground.

One or more transportation devices, such as transportation device 430, may be configured to raise and lower the entire mounting structure 400 during operation of the drill, e.g. to move the drill relatively short distances from one well head centerline to another. Additionally, mounting structure 400 may be configured to be placed into a compact state for distant transportation. Strut 25 may be rotated about second end 455 towards a transport/storage position 425A, shown in dashed lines. Being connected to transport support 420 at a raised elevation with respect to base 80, first end 445 of strut 25 may rotate with sufficient clearance to avoid contact with base 80 as strut 25 is rotated into transport/storage position 425A.

Figure 5A:
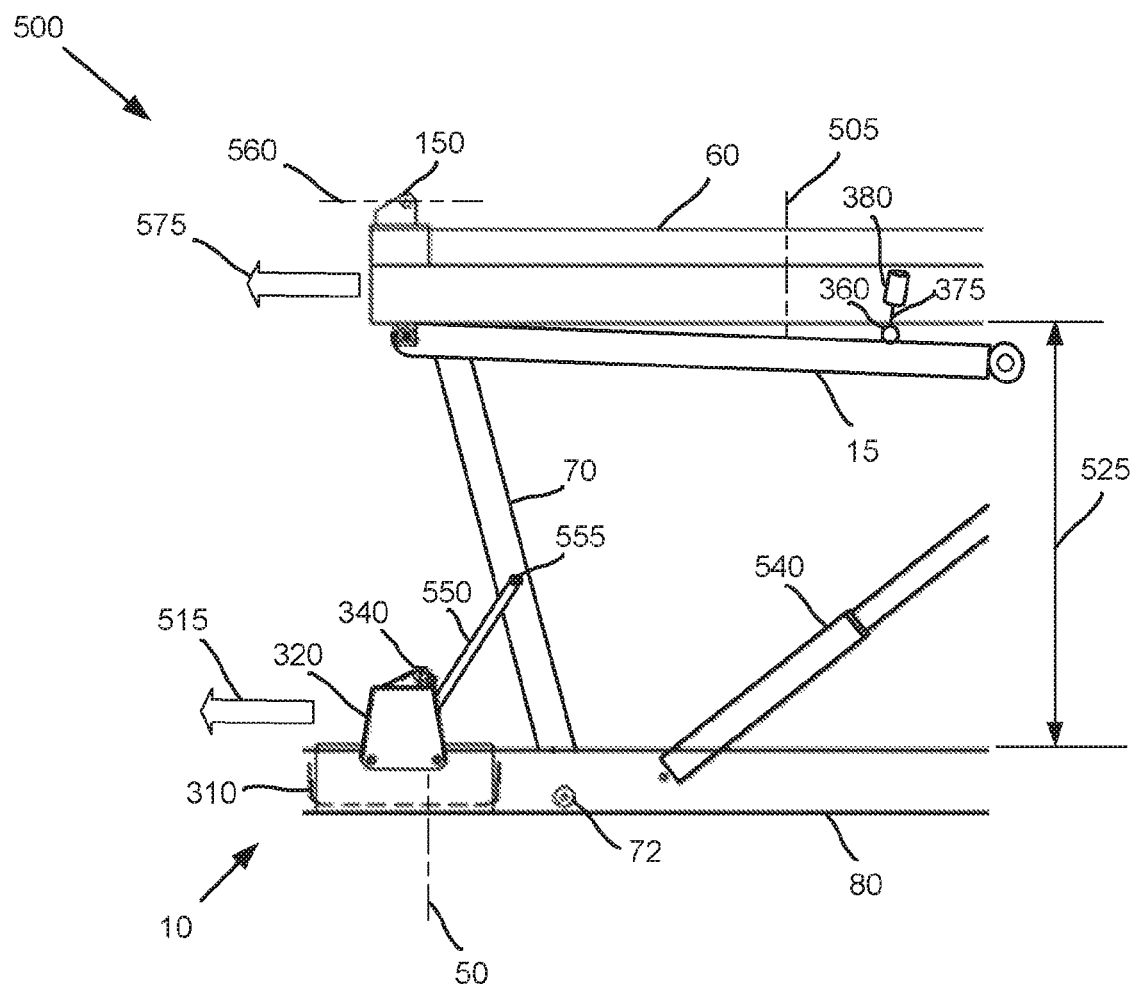
FIG. 5A illustrates a first portion of the mounting structure of FIG. 1 in a partially collapsed transport/storage position.

FIG. 5A illustrates a first portion of the mounting structure 100 of FIG. 1 in a partially collapsed transport position, in which strut 15 is shown in an approximately horizontal storage position. Strut 15 may comprise a latch point 360 configured to lift and/or securely connect strut 15 to rig platform 60. In some examples, a cable 375 may extend between latch point 360 and a lifting mechanism 380 attached to rig platform 60 to facilitate the rotation of strut 15 into the horizontal transport/storage position.

The rig platform 60 is shown as having been lowered to a partially collapsed height 525 with respect to base 80. Hydraulic cylinder 540 is shown in a partially extended position as first leg 70 pivots rig platform 60 downward, causing a rig centerline 505 associated with rig platform 60 to move away from, e.g., to the left 575 of, well head centerline 105 (FIG. 1). In some examples, the rig and/or load may be removed from mounting structure 100 prior to lowering rig platform 60, such that the overall height 560 of mounting structure 100 may be associated with rig support structure 150.

A push-pull rod 550 or connecting member may operatively connect transport support 320 of first transport system 10 to first leg 70. Push-pull rod 550 may be rotatably connected to first leg 70 at a pivoting connection 555 and may be configured to push and/or pull at least a portion of first transport system 10 in response to the rotation of first leg 70 about pivoting connection 72. In some examples, push-pull rod 550 may be configured to push transport support 320 and/or transportation device 310 away from well head centerline 105 in a substantially lateral direction 515. At least a portion of first transport system 10, such as transport support 320 and/or transport device 310, may be moved away from first load bearing position 50 in response to lowering rig platform 60. Push-pull rod 550 may push transport support 320 in the lateral direction 515 as first leg 70 pivots about pivoting connection 72 with respect to base 80. In some examples, transport support 320 may be moved in the lateral direction 515 after being disconnected from strut 15.

Figure 5B:
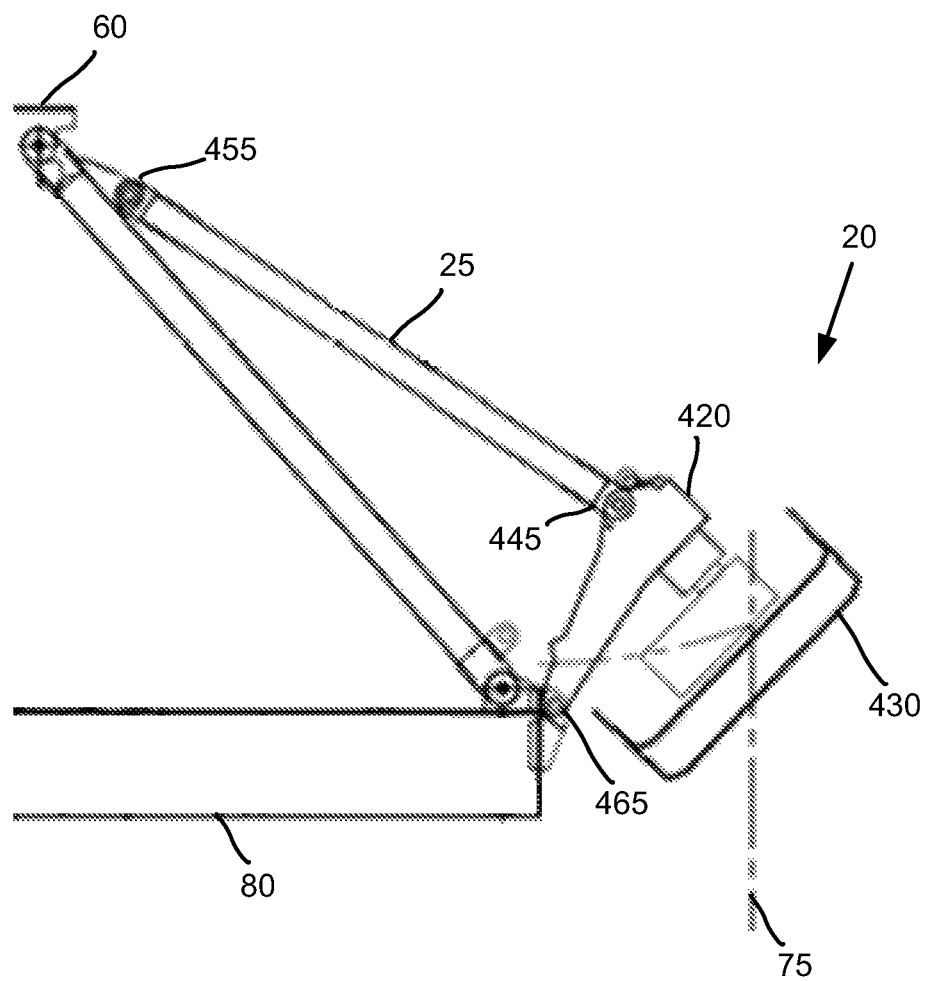
FIG. 5B illustrates a second portion of the mounting structure of FIG. 1 in a partially collapsed transport/storage position.

FIG. 5B illustrates a second portion of the mounting structure 100 of FIG. 1 in a partially collapsed transport/storage position. At least a portion of second transport system 20, such as transport support 420 and/or transport device 430, may be moved away from second load bearing position 75 in response to lowering rig platform 60 towards base 80. In some examples, as rig platform 60 is being lowered to the partially collapsed transport position, strut 25, or another connecting member, may be configured to lift and/or rotate at least a portion of second transport system 20 about connection point 465. In some examples, one or both of first end 445 and second end 455 of strut 25 may be configured to allow strut 25 to pivot with respect to rig platform 60 and transport support 420, respectively.

Figure 6:
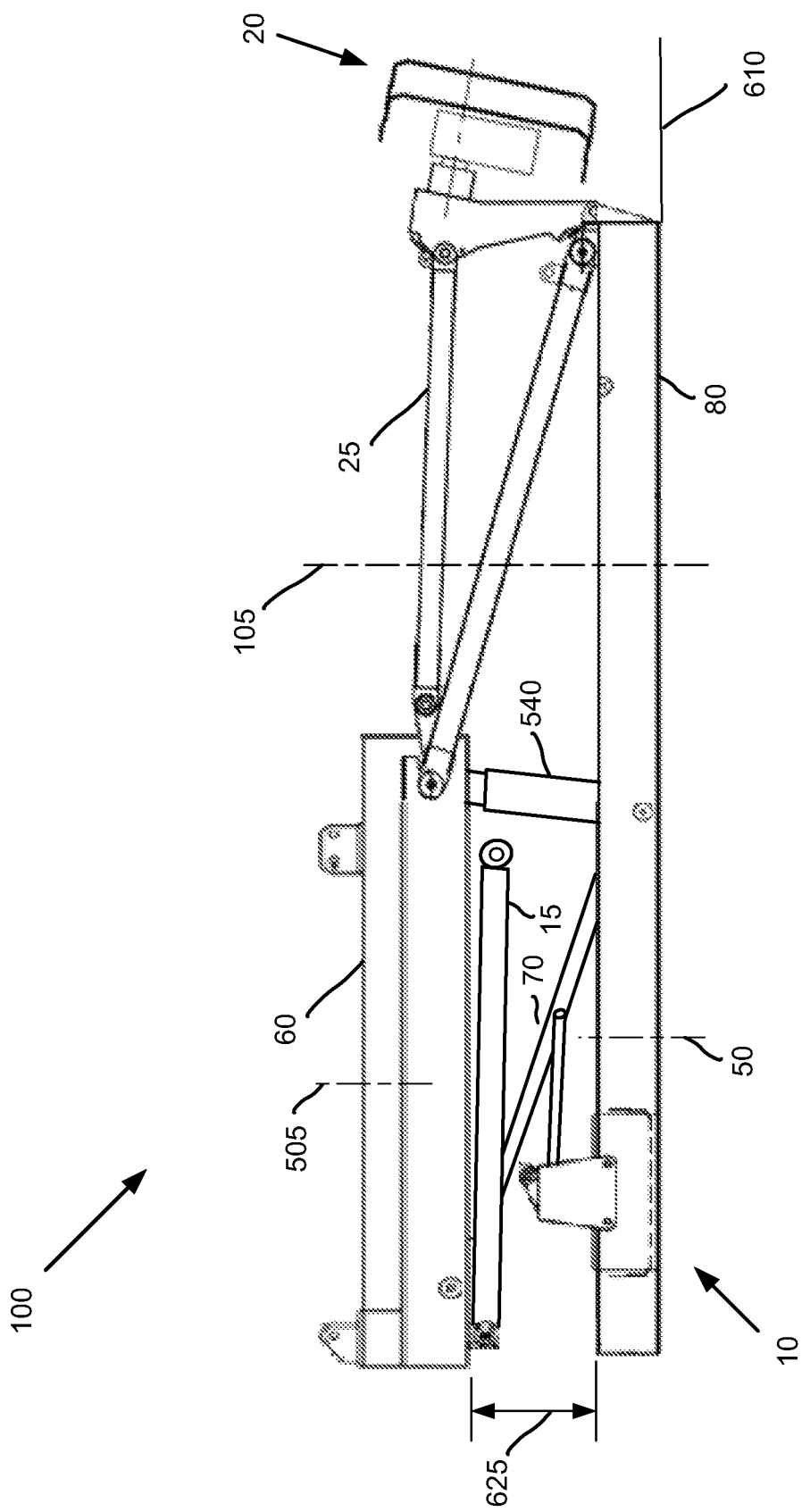
FIG. 6 illustrates the mounting structure of FIG. 1 in a fully collapsed position.

FIG. 6 illustrates the mounting structure 100 of FIG. 1 in a fully collapsed transport/storage position. Both strut 15 and strut 25 are shown in a substantially horizontal transport/storage position, and hydraulic cylinder 540 is shown in a retracted position. The rig platform 60 is shown as having been lowered to a collapsed height 625 with respect to base 80. Rig centerline 505 associated with rig platform 60 has moved away from well head centerline 105, such that substantially the entire rig platform 60 is positioned to the left of well head centerline 105.

At least a portion of transport system 10 has also been laterally moved away from first load bearing position 50 in response to lowering rig platform 60, such that first transport system 10 and/or second transport system 20 does not interfere with the reduced overhead clearance associated with one or more struts, cylinders, or legs, such as first leg 70, in the fully collapsed transport position of mounting structure 100. Additionally, at least a portion of second transport system 20 may be rotated and/or raised in response to lowering rig platform 60 such that second transport system 20 is no longer in contact with the ground and/or surface 610. In some examples, an upper portion of second transport system 20 may be rotated and/or moved independent of a lower portion of second transport system 20.

By rotating second transport system 20, the length of mounting structure 100 may be reduced. In some examples, the overall length of mounting structure 100 in the fully collapsed transport/storage position may be equal to, or approximate, the length of base 80.

Figure 7:
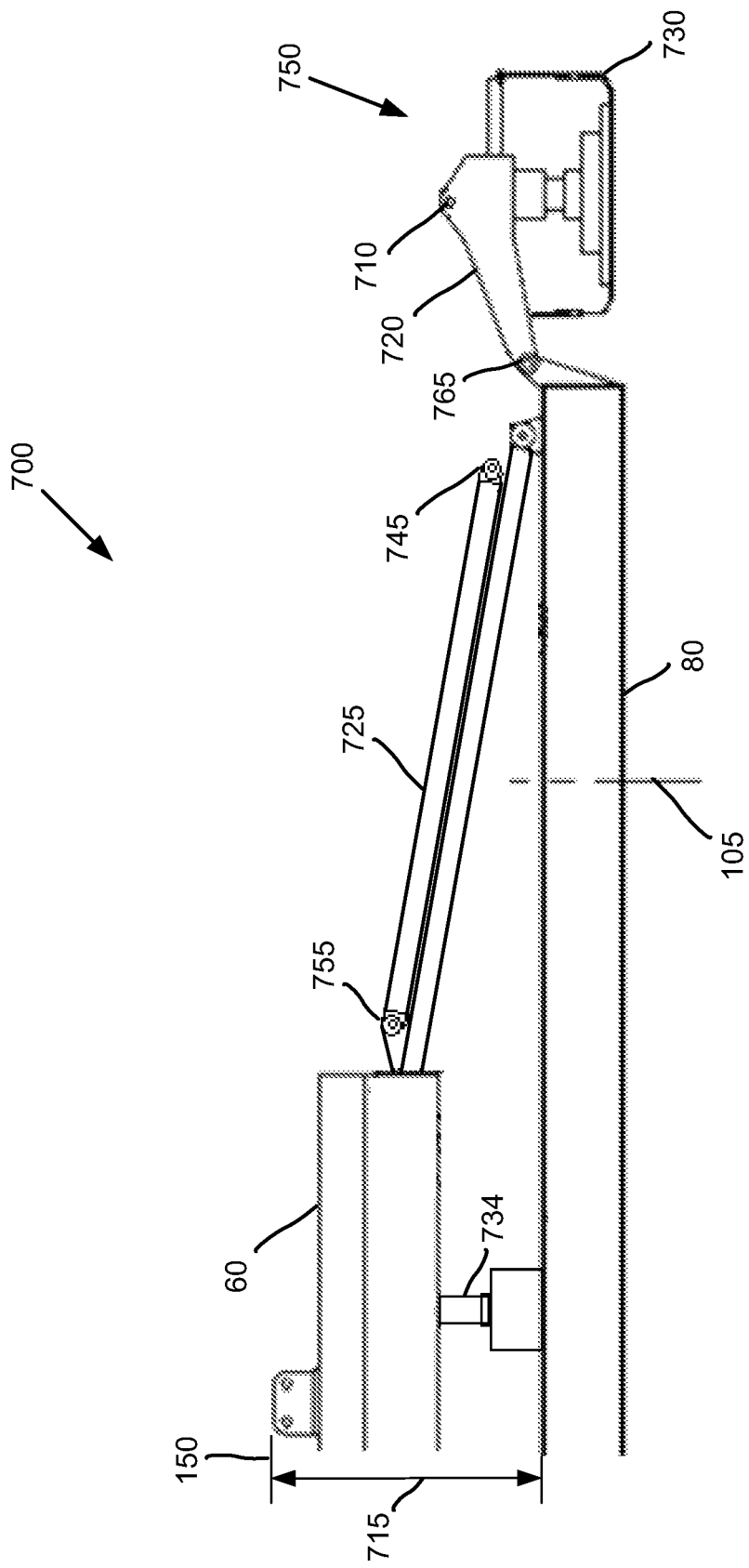
FIG. 7 illustrates a mounting structure, such as the mounting structure of FIG. 1, in an alternative example transport/storage position.

FIG. 7 illustrates a mounting structure 700, including an example transport system 750 in an alternative transport/storage position. A first end 745 of a strut 725 is shown disconnected from a transport support 720 of transport system 750, such that transport support 720 and a corresponding transport device 730 may remain adjacent to base 80, e.g., on the ground, with rig platform in the fully collapsed transport/storage position. Rig platform 60 is shown moved to off to one side of well head centerline 105 and an overall height 715 of mounting structure 700 may determined for the highest point of the rig and/or rig support structure 150 in the fully collapsed position.

Transport support 720 may comprise a lift point 710 configured to provide means for lifting and/or rotating at least a portion of transport system 750. Lift point 710 may be fitted with a cable and a hoist may be used to lift or rotate transport support 720 and/or transport device 730 off the ground. In some examples, transport support 720 may be disconnected from base 80 at a connection point 765, such that at least a portion of transport system 750 may be separately transported and/or stored from mounting structure 700. In still other examples, transport system 750 may be placed on base 80 or on rig platform 60 during transport and/or during storage of mounting structure 700.

One or more support braces 734 may be configured to support the weight of rig platform 60 in the fully collapsed transport/storage position. Additionally, the one or more support braces 734 may be configured to maintain clearance between transport system 750 and/or transport systems 10, 20 (FIG. 6) and one or more struts, cylinders, or legs, such as first leg 70 and strut 15, with mounting structure 700 in the fully collapsed transport/storage position.

Figure 8:
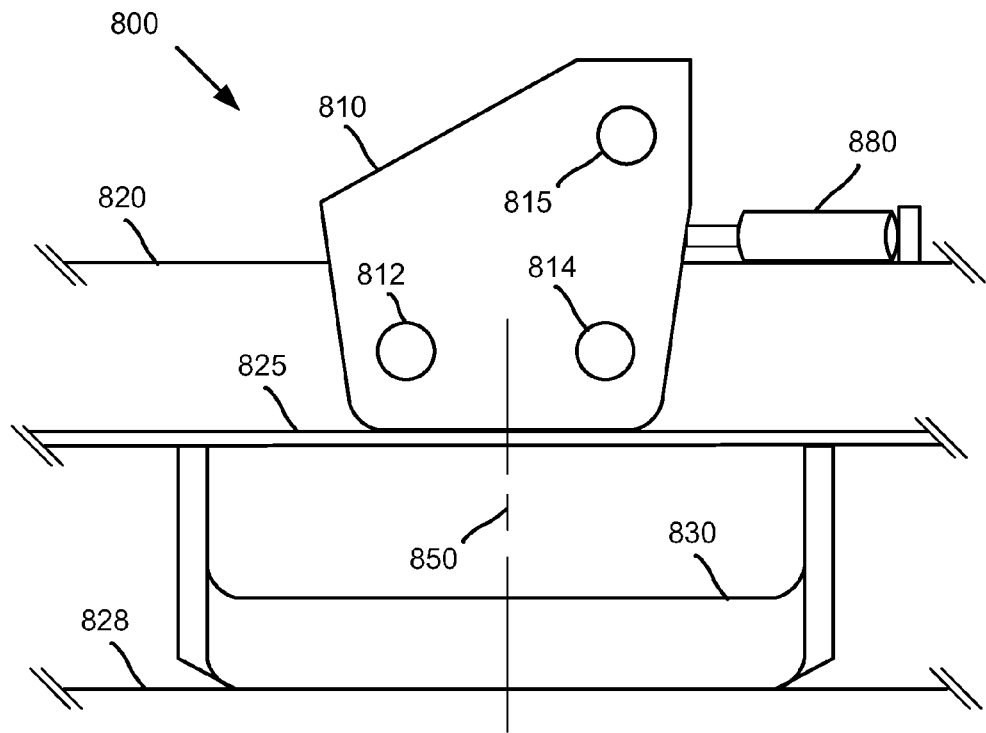
FIG. 8 illustrates an example support structure.

FIG. 8 illustrates an example support structure 800 in a first mode of operation. The first mode of operation may be associated with operation of support structure 800 during a drilling operation or during a rig walking operation. During the first mode of operation, the bottom of a base 820 may be in contact with the ground or other surface 828 upon which support structure 800 may be placed on.

An upper portion 810 of a transport system may be mounted to base 820. In some examples, upper portion 810 may comprise a number of mounting devices 812, 814 or holes through which one or more bolts, pins, rods, hooks, clamps, latches, or other types of connection devices may be used to mount upper portion 810 to base 820. Additionally, upper portion 810 may comprise a connection device 815 for connecting to a strut or other type of support member, such as strut 15 (FIG. 1). Support structure 810 may be connected to a push-pull device 880, or connecting member, shown in a retracted position. Push-pull device 880 may comprise a hydraulic cylinder, a jack, a piston, a gear, a winch, a roller, a track, other types of pushing devices or pulling devices such as push-pull rod 550 (FIG. 5A), or any combination thereof. In some examples, push-pull device 880 may be connected to support structure 810 at a first end of push-pull device 880 and may be connected to base 820 at a second end of push-pull device 880.

The transport system associated with support structure 800 may be approximately centered about a load bearing path 850. In some examples, a transport device 830 may be configured to lift base 820 along load bearing path 850. Upper portion 810 may be configured as a transport support, e.g., to operably connect transport device 830 to base 820. Additionally, upper portion 810 may be configured to transfer the weight of a load supported by base 820 onto the transport device 830. In some examples, upper portion 810 may be configured to transfer or offset the effective weight of the load onto the load bearing path 850 that passes through transport device 830.

Base 820 may comprise a connecting structure 825, which may be configured as a substantially horizontal plate. In some examples upper portion 810 may be located above and/or on top of connecting structure 825, such that mounting devices 812, 814 may attach to an upper portion of base 820. Connecting structure 825 may be located at an approximate vertical mid-point of base 820. In some examples, connecting structure 825 may be used to help locate upper portion 810 with respect to base 820. Additionally, connecting structure 825 may provide vertical support of the weight that is transferred from upper portion 810 to the load bearing path 850 associated with transport device 830.

Figure 9:
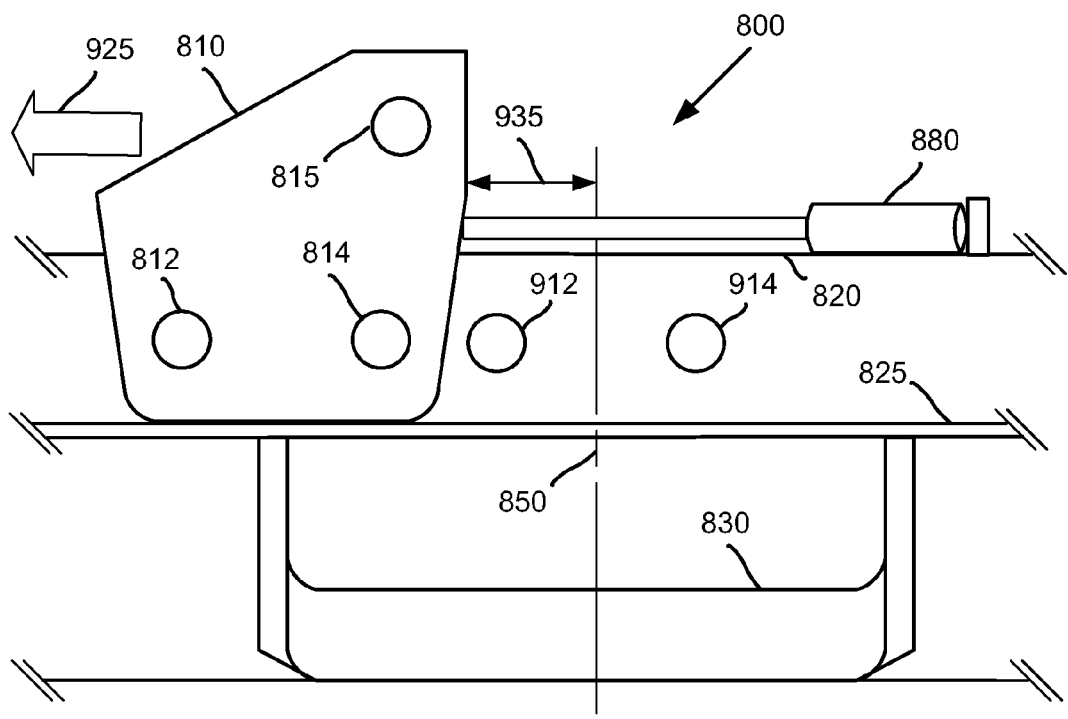
FIG. 9 illustrates the example support structure of FIG. 8 in a transport/storage position.

FIG. 9 illustrates the example support structure 800 of FIG. 8 in a second mode of operation, in which upper portion 810 has been moved in a lateral direction 925 away from load bearing path 850. Upper portion 810 may be moved far enough in the lateral direction 925 to provide a lateral clearance 935 with load bearing path 850. The second mode of operation may be associated with the storage and/or long distance transport of support structure 800.

A number of receiving devices 912, 914 may be located in base 820. Receiving devices 912, 914 may comprise through-holes which correspond in number and relative position with mounting devices 812, 814 of upper portion 810. For example, a first pin or bolt may be placed through corresponding holes associated with mounting device 812 and receiving device 912 with support structure configured in the first mode of operation (FIG. 8), and a second pin or bolt may be placed through corresponding holes associated with mounting device 814 and receiving device 914 in the first mode of operation.

The first pin and/or second pin may be configured to impede movement of upper portion 810 in the lateral direction 925. The pins/bolts may be removed so that upper portion 810 is allowed to move in the lateral direction 925 during the second mode of operation. Upper portion 810 may be configured to slide along connecting structure 825. In some examples, some or all of transport device 830 may also move in the lateral direction 925 together with upper portion 810.

Connection device 815 may be disconnected from a strut or other type of support member prior to upper portion 810 being moved in the lateral direction 925. In other examples, the push-pull device 880, shown in an extended position, may be configured to push and/or pull upper portion 810 in the lateral direction 925.

Figure 10:
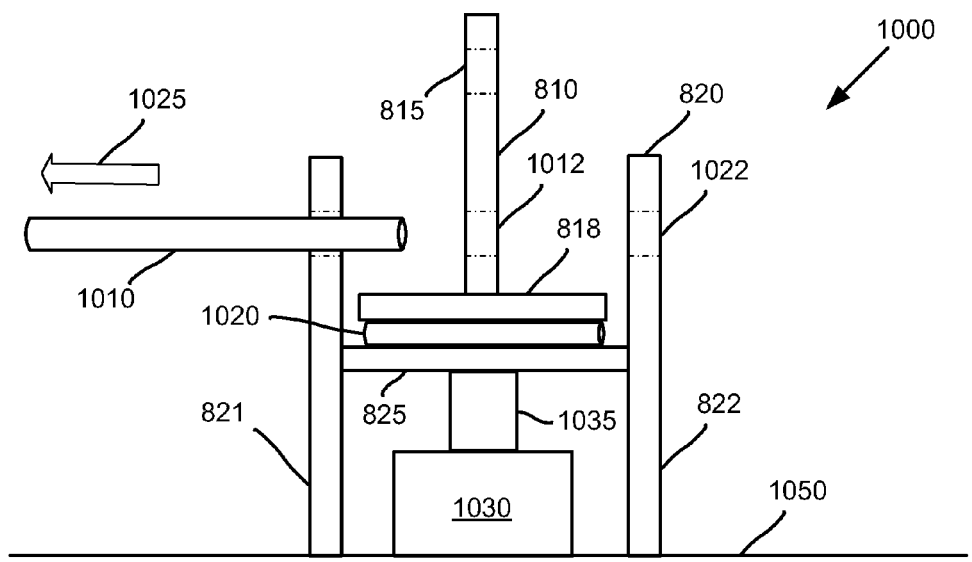
FIG. 10 illustrates a further example support structure.

FIG. 10 illustrates a further example support structure 1000 including the base 820 and upper portion 810 of FIG. 9 shown in a cross-sectional view. Base 820 may comprise a first base plate 821 and a second base plate 822 connected by connecting structure 825. One or more holes, such as through-hole 1022, may penetrate through one or both of first base plate 821 and second base plate 822. Additionally, upper portion 810 may comprise one or more holes such as through-hole 1012. A connection device 1010 is shown in a partially withdrawn position 1025 and extending outside of a hole in first base plate 821. Connection device 1010 may comprise a bolt, pin, rod, hook, clamp, latch, other types of connection device, or any combination thereof, that may be inserted through upper portion 810 and base 820 via one or more through-holes 1012, 1022.

Upper portion 810 may be positioned directly above a transport device 1030 configured to lift and/or rotate base 820. In some examples, a rotation/translation device 1035 may be configured to rotate and/or translate transport device 1030 within the base frame defined by first base plate 821 and second base plate 822. First base plate 821 and second base plate 822 may rest on the ground or surface 1050 when base 820 is not being lifted by transport device 1030.

One or more rollers 1020 may be placed between a contact surface 818 of upper portion 810 and connecting structure 825 to facilitate moving or rolling upper portion 810 with respect to base 820. In some examples, connection device 1010 may be removed entirely from through holes 1012, 1022 and used as a roller between contact surface 818 and connecting structure 825. In other examples, upper portion 810 may be configured to slide via direct contact between contact surface 818 and connecting structure 825 without the use of any rollers. Connection device 815 may be disconnected from a strut or other type of support member prior to upper portion 810 being moved on the one or more rollers 1020. In other examples, a push-pull device attached to connection device 815 may be configured to push and/or pull upper portion 810.

Figure 11:
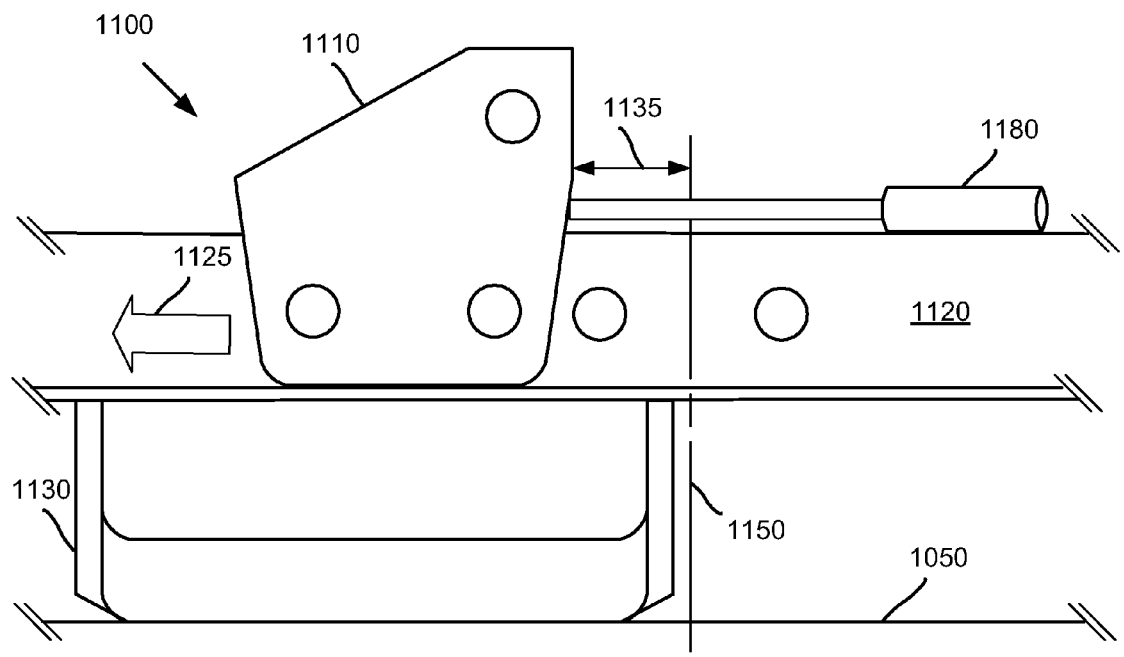
FIG. 11 illustrates an example support structure in a transport/storage position.

FIG. 11 illustrates a further example support structure 1100 in a transport/storage position. In some examples, substantially the entire support structure 1100 including an upper portion 1110 of support structure 1100 and a corresponding transport device 1130 may be moved in a lateral direction 1125 away from a load bearing path 1150. Transport device 1130 may be mounted, bolted, welded, or otherwise connected to upper portion 1110. Upper portion 1110 may be moved far enough in the lateral direction 1125 to provide a lateral clearance 1135 with load bearing path 1150. Similarly, transport device 1130 may be moved away from load bearing path 1150.

Upper portion 1110 may be configured to slide, roll, or otherwise move along one or more surfaces or rails of a base structure 1120. Additionally, transport device 1130 may be configured to slide, roll, or otherwise move along the ground or surface 1050 in the lateral direction 1125. In some examples, support structure 1100 may comprise a hydraulic cylinder or other device configured to lift transport device 1130 off of the ground or surface 1050. Transport device 1130 may be moved in the lateral direction 1125 in a raised position.

A push-pull device 1180 or connecting member, shown in an extended position, may be connected to one or both of upper portion 1110 of support structure 1100 and transport device 1130. In some examples, push-pull device 1180 may comprise similar structural features, or be configured similarly, as push-pull device 880 (FIG. 8).

When support structure 1100 is located in the transport/storage position, it may be operably disconnected from base structure 1120 such that support structure 1100 may no longer be configured to provide a lifting function of base structure 1120 and/or of an associated rig that may be mounted to base structure 1120. After the rig has been moved to a new location, support structure 1100 may be moved back to an operational position, e.g., with a centerline of transport device 1130 approximately aligned with load bearing path 1150, so that support structure 1100 may again be configured to provide the lifting function.

Figure 12:
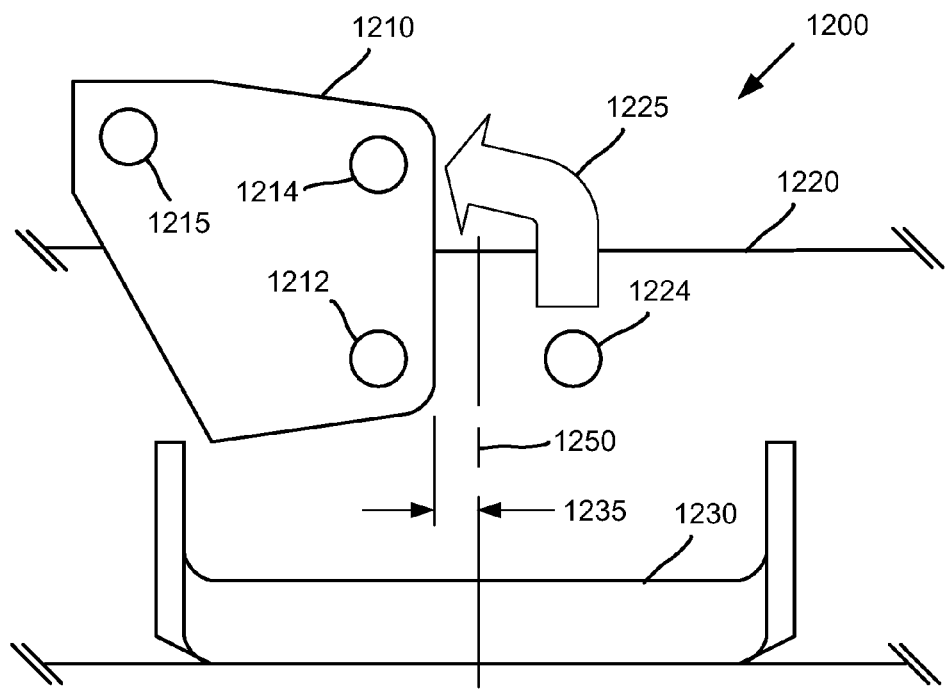
FIG. 12 illustrates a further example support structure in a transport/storage position.

FIG. 12 illustrates yet another example support structure 1200 comprising an upper portion 1210 of a transport system configured to rotate about a pivot point 1212. Pivot point 1212 may comprise a bolt, a pin, a rod, or other type or pivot point configured to pivotably connect upper portion 1210 with a base 1220. In some examples, upper portion 1210 may be configured to mount to base 1220 at both pivot point 1212 and at connection point 1214. Connection point 1214 may align with a receiving point 1224 on base in a first mode of operation associated with transport device 1230, and a pin, rod, hook, clamp, latch, other types of connection device, or any combination thereof, may be used to attach connection point 1214 with receiving point 1224.

Connection point 1214 is shown in a rotated position 1225, e.g., during a second mode of operation, up and away from receiving point 1224, such that a lateral clearance 1235 is formed between upper portion 1210 and a load bearing path 1235 associated with transport device 1230. The second mode of operation may be associated with storage and/or a long distance transport operation of base 1220.

A connection device located at connection point 1214 and/or at receiving point 1224 may be removed to allow connection point 1214 to pivot to the rotated position 1225. On the other hand, upper portion 1210 may be rotated while a second connection device remains connected at pivot point 1212.

In some examples, upper portion 1210 may be rotated and/or moved to rotated position 1225 independent of any movement of transport device 1230. In other examples, the rotation of upper portion 1210 may cause some or all of transport device 1230 to also rotate.

Figure 13:
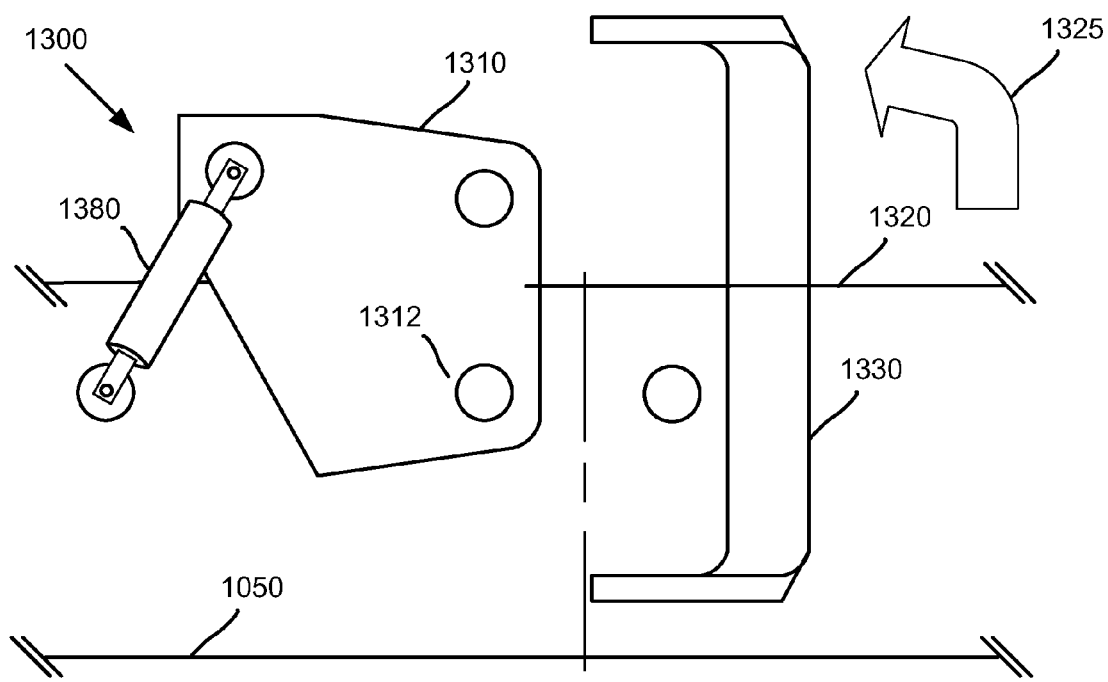
FIG. 13 illustrates yet another example support in a transport/storage position

FIG. 13 illustrates yet another example support structure 1300 in a transport/storage position. Substantially the entire support structure 1300 including an upper portion 1310 of support structure 1300 and a corresponding transport device 1330 of support structure 1300 may be moved in a rotational direction 1325 about a rotational axis 1312, such that transport device 1330 may be lifted off of the ground or surface 1050. In some examples, transport device 1330 may be rotated from an approximately horizontal orientation associated with a lifting function, to a substantially vertical orientation associated with the transport/storage position. Transport device 1330 may be mounted, bolted, welded, or otherwise connected to upper portion 1310.

A push-pull device 1380, shown in a retracted position, may be connected to one or both of upper portion 1310 of support structure 1300 and transport device 1330. In some examples, push-pull device 1380 may comprise similar structural features, or be configured similarly, as push-pull device 880 (FIG. 8).

When support structure 1300 is located in the transport/storage position, it may be operably disconnected from a base structure 1320 such that it may no longer be configured to provide a lifting function of base structure 1320 and/or of an associated rig that may be mounted to base structure 1320.

Figure 14:
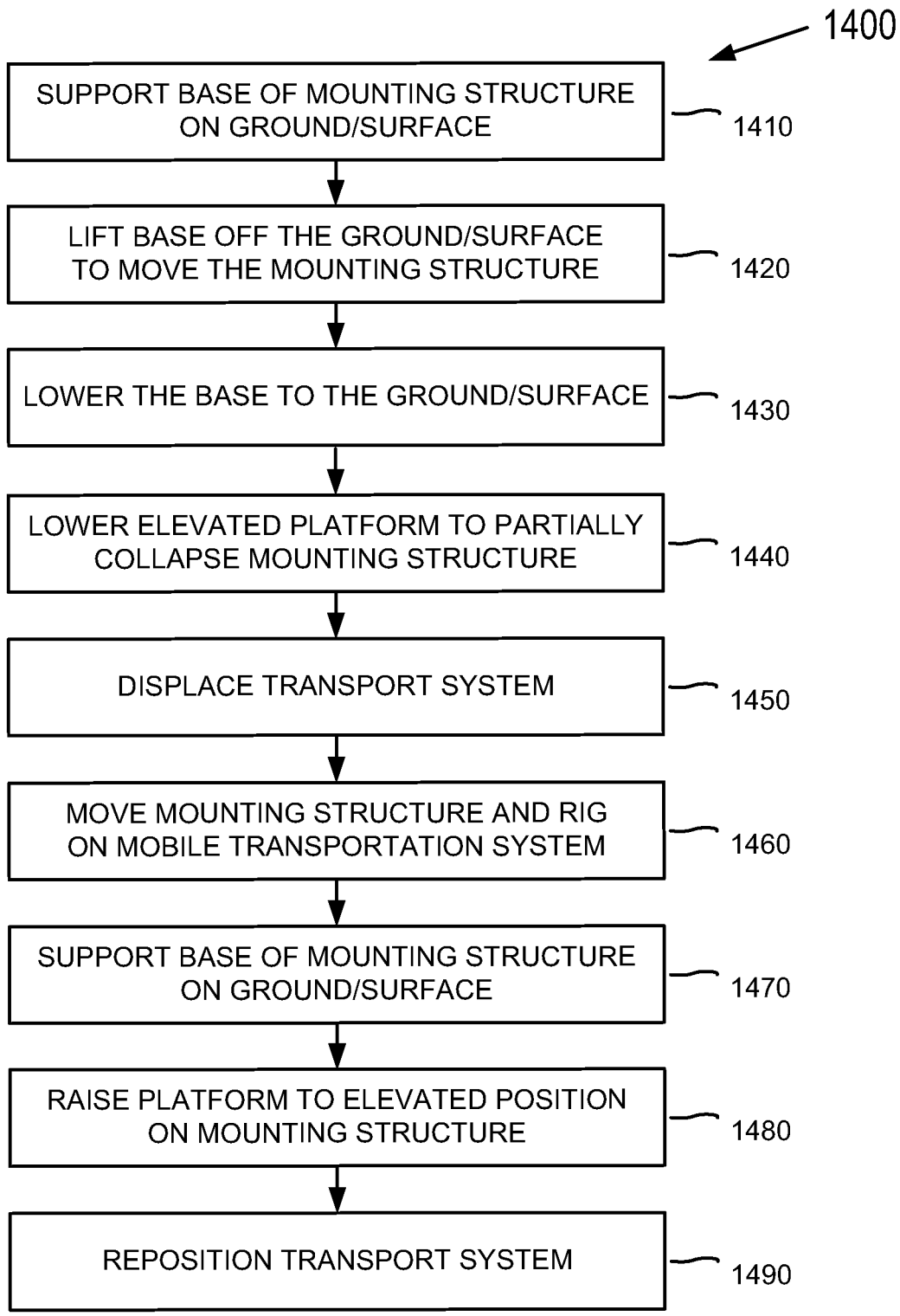
FIG. 14 illustrates an example operation associated with a mounting structure having a storable transport system.

FIG. 14 illustrates an example process 1400 associated with a mounting structure having a storable transport system. At operation 1410, a base of the mounting structure may be supported on an operating surface, such as the ground, a mat, a pad, a platform, a barge, or other type of surface. The base may be connected to an elevated platform of the rig with one or more support beams. In some examples, at least one of the support beams may comprise a diagonal strut connecting the elevated platform to the base structure. By way of illustrative example only, an extraction of a petroleum-based resource may be performed at a first, or initial, location. In other examples, operations performed at the initial location may include drilling a hole, inserting a pipe, fracking, other types of operations, or any combination thereof.

At operation 1420, the base of the mounting structure may be lifted off of the operating surface by a rig transport system to move the mounting structure to a destination and/or a second location, following the operation performed at the initial location. The mounting structure may be repositioned by moving the base from the initial location to the new location while a rig is supported by the mounting structure.

In some examples, mounting structure may be positioned by a first rig transport system positioned at the rear end of the mounting structure and a second rig transport system positioned at a front end of the mounting structure, opposite the rear end. The mounting structure may be positioned by raising the rear end of the mounting structure with the first rig transport system. Positioning the mounting structure may further comprise raising the front end of the mounting structure with the second rig transport system. In other examples, one or more transport systems may be located at different or additional locations with respect to the mounting structure.

At operation 1430, the base of the mounting structure may be lowered by the rig transport system to the operating surface at the destination and/or at the second location. A second operation may be performed at the second location.

At operation 1440, an elevated rig platform connected to the base by a plurality of support struts may be lowered. The elevated platform may be lowered while the base is in contact with the operating surface. At least some of the support struts may comprise a mounting connection that pivots to lower the rig platform toward the base. In some examples, the rig platform is lowered towards the base at the completion of an operation, such as where the mounting structure and/or rig are being prepared for storage and/or long distance transportation.

At operation 1450, at least a portion of the rig transport system may be displaced by a connecting member in response to the rig platform being lowered. The portion of the rig transport system may be displaced by the connecting member while the base remains in contact with the operating surface. The connecting member may be configured to attach the portion of the rig transport system to one of the support struts that includes a pivoting mounting connection.

In some examples, at least a portion of the rig transport system may be displaced in order to provide a more compact mounting structure in the collapsed state. Additionally at least a portion of the rig transport system may be displaced in order to provide additional clearance between the rig transport system and one or more components attached to the rig platform being lowered to the base.

In some examples, the rig transport system may be configured to contact the operating surface at a load bearing position while lifting the mounting structure at operation 1220. The connecting member may be configured to displace the portion of the rig transport system away from the load bearing position while the rig platform is being lowered at operation 1240.

The base may comprise two walls connected by a substantially horizontal connecting structure or plate. One or both of the two walls may be configured to contact the operating surface when the mounting structure is not being lifted by the rig transport system. In some examples, the rig transport system fits between the two walls. Additionally, the rig transport system may comprise a transport device or walker that is configured to rotate within the confines of the two base walls. The portion of the rig transport system that is displaced may be located above the horizontal connecting structure. In some examples, the portion of the rig transport system may be laterally displaced along the horizontal connecting structure in response to the rig platform being lowered.

The base may extend substantially along an entire length of the mounting structure, and at least one of the rig transport systems may be connected to an end of the base. The portion of the rig transport system may be rotationally displaced about the end of the base in response to the rig platform being lowered.

At operation 1460, the entire mounting structure and/or rig may be transported on a mobile transportation system such as one or more semi-trucks, rail cars, barges, other transportation vehicles, or any combination thereof. The mounting structure may be transported to a storage facility, and in some examples the mounting structure may be transported to a new operational site or destination which may be located many miles away from the present location. The mounting structure may be transported in the partially collapsed or completely collapsed position.

At operation 1470, the support base of the mounting structure may be placed on the ground and/or on a support surface at the destination.

At operation 1480, the rig platform may be raised to an elevated position on the mounting structure. The rig platform may be raised while the base is in contact with the operating surface. The mounting connections of the one or more support struts may pivot to raise the rig platform to the elevated position. In some examples, the rig platform may be raised to the elevated position prior to performing an operation at the destination.

At operation 1490, at least a portion of the rig transport system may be repositioned by the connecting member in response to the rig platform being raised. The portion of the rig transport system may be repositioned and/or displaced by the connecting member while the base remains in contact with the operating surface. The connecting member may be configured to attach the portion of the rig transport system to one of the support struts that includes a pivoting mounting connection.

In some examples, the rig transport system may be configured to move the mounting structure between one or more drill sites at the destination with the rig platform in the raised position and with the portion of the rig transport system repositioned above a load bearing position of a corresponding transport device, such as a walker.

Some or all of the example structures discussed above with respect to FIGS. 1-14 may be configured to allow the rig platform to collapse down to the base during break-down or transportation of the rig to a drill site. In some examples, the examples may comprise connections that provide pivot points where they connect to one or more of the struts, braces, and/or legs.

A rig may be modified with one or more of the struts, legs, braces, connections, and/or structural features described with reference to FIGS. 1-14 to enable the placement of a draw-works on a rig and/or rig platform. The placement of the structural features, such as the struts, provides the ability to maintain a structural load path of the original rig design while drilling, after the rig has been modified.

Some examples have been described above, and in addition, some specific details are shown for purposes of illustrating the inventive principles. However, numerous other arrangements may be devised in accordance with the inventive principles of this patent disclosure. Further, well known processes have not been described in detail in order not to obscure the novel features. Thus, while examples are described in conjunction with the specific embodiments illustrated in the drawings, the examples are not limited to these embodiments or drawings.

The invention claimed is:

1. A mounting structure for a rig, comprising:
a base configured to support the mounting structure on an operating surface,
a plurality of transport systems operatively connected to the base and configured to lift the mounting structure off of the operating surface;
an elevated rig platform connected to the base by a plurality of support struts, wherein at least some of the support struts comprise a pivoting connection that is configured to rotate a support strut from an elevated position to a collapsed position as the elevated rig platform is lowered toward the base to place the mounting structure in a partially collapsed state; and
a connecting member operably coupled to one or more of the plurality of transport systems and directly attached to the support strut, wherein in response to the elevated rig platform being lowered to the partially collapsed state, the connecting member is configured to displace at least a portion of the one or more transport systems while the support strut is being rotated from the elevated position to the collapsed position and while the elevated rig platform is being lowered toward the base.

2. The mounting structure of claim 1, wherein the one or more transport systems are configured to contact the operating surface at a load bearing position while lifting the mounting structure, and wherein the connecting member is configured to displace the portion of the one or more transport systems away from the load bearing position while the elevated rig platform is being lowered toward the base.

3. The mounting structure of claim 1, wherein the one or more transport systems comprise:
a transport device configured to contact the operating surface; and
a strut connection mounted to the base at a location above the transport device, wherein the connecting member is attached to the strut connection, and wherein the portion of the one or more transport systems that is configured to be displaced by the connecting member comprises the strut connection.

4. The mounting structure of claim 3, wherein the strut connection is detachably mounted to the base, and wherein the strut connection is configured to be laterally displaced by the connecting member along one or more surfaces of the base after being detached from the base, without displacing the transport device.

5. The mounting structure of claim 2, wherein the connecting member is pivotally attached to the support strut, and wherein the connecting member is configured to displace the portion of the one or more transport systems in response to the connecting member pivoting while the elevated rig platform is being lowered toward the base.

6. The mounting structure of claim 5, wherein the one or more transport systems comprise:
a transport device configured to contact the operating surface; and
a strut connection attached to the connecting member at a location above the transport device, wherein the portion of the one or more transport systems that is displaced by the connecting member comprises both the strut connection and the transport device.

7. A mounting structure for a rig, comprising:
a base configured to support the mounting structure on an operating surface;
means for lifting the base off of the operating surface;
an elevated rig platform connected to the base by a plurality of support struts, wherein at least some of the support struts comprise a pivoting connection that is configured to rotate a support strut from an elevated position to a collapsed position as the elevated rig platform is lowered toward the base to place the mounting structure in a partially collapsed state; and
means for displacing at least a portion of the means for lifting in response to the elevated rig platform being lowered to the partially collapsed state, wherein the means for displacing connects the elevated rig platform directly to the means for lifting, and wherein the portion of the means for lifting is displaced while the support strut is being rotated from the elevated position to the collapsed position, while the rig platform is lowered toward the base, and while the base remains in stationary contact with the operating surface.

8. The mounting structure of claim 7, wherein the base comprises two walls connected by a horizontal connecting structure, wherein both of the two walls are configured to contact the operating surface, and wherein the means for lifting is located between the two walls.

9. The mounting structure of claim 8, wherein the portion of the means for lifting is located above the horizontal connecting structure, and wherein the means for displacing comprises means for laterally displacing the portion of the means for lifting along a surface of the base.

10. The mounting structure of claim 7, wherein the means for displacing comprises means for rotationally displacing the portion of the means for lifting.

11. The mounting structure of claim 7, wherein the base extends substantially along an entire length of the mounting structure, and wherein the means for lifting is connected to an end of the base and is located outside of the length of the base.

12. The mounting structure of claim 11, wherein the means for lifting is pivotally connected to the end of the base, and wherein the means for displacing comprises means for rotationally displacing the portion of the means for lifting.

13. A method for placing a mounting structure in a partially collapsed state, comprising:
supporting a base of the mounting structure on an operating surface;

lifting, with a transport system, the base off of the operating surface to move the mounting structure to a destination;

lowering, with the transport system, the base to contact the operating surface at the destination;

lowering an elevated rig platform connected to the base by a plurality of support struts, wherein the elevated rig platform is lowered while the base is in contact with the operating surface, and wherein at least some of the support struts comprise a pivoting connection that is configured to rotate a support strut from an elevated position to a collapsed position as the elevated rig platform is being lowered toward the base; and displacing, with a connecting member directly attached to the support strut, at least a portion of the transport system in response to the elevated rig platform being lowered into the partially collapsed state, wherein the portion of the transport system is displaced by the connecting member while the support strut is being rotated from the elevated position to the collapsed position, while the elevated rig platform is being lowered toward the base, and while the base remains in stationary contact with the operating surface.

14. The method of claim 13, wherein the transport system contacts the operating surface at a load bearing position while lifting the mounting structure, and wherein the connecting member displaces the portion of the transport system away from the load bearing position while the elevated rig platform is being lowered toward the base.

15. The method of claim 14, wherein the base comprises two walls connected by a horizontal connecting structure, wherein both of the two walls are configured to contact the operating surface, and wherein the transport system is located between the two walls.

16. The method of claim 15, wherein the portion of the transport system is located above the horizontal connecting structure, and wherein displacing the portion of the transport system comprises laterally displacing the portion of the transport system along the horizontal connecting structure while the elevated rig platform is being lowered toward the base.

17. The method of claim 14, wherein the base extends substantially along an entire length of the mounting structure, wherein the transport system is connected to an end of the base, and wherein displacing the portion of the transport system comprises rotationally displacing the portion of the transport system about the end of the base.

18. The mounting structure of claim 1, wherein the connecting member is configured to displace the portion of the one or more transport systems both while the elevated rig platform is being lowered toward the base and while the base remains in stationary contact with the operating surface.

19. The method of claim 13, wherein the connecting member is additionally attached to the portion of the load transport system.

* * * * *